Patented Feb. 4, 1936

2,029,958

UNITED STATES PATENT OFFICE 2,029,958

PROCESS FOR THE PURIFICATION OF ORGANICALLY POLLUTED WATERS

Oliver M. Urbain, Columbus, Ohio, assignor to Charles H. Lewis, Harpster, Ohio

No Drawing. Application August 28, 1933, Serial No. 687,245

5 Claims. (Cl. 210—2)

This invention relates to a process for purification of organically polluted waters.

It is the broad object of the invention to provide an improved process applicable to both biological and chemical precipitation processes for treating polluted liquids such as municipal sewage and industrial waste.

In a more specific aspect it is an object of the invention to provide an improved process for oxidizing putrescible organic matter present in the liquid, more particularly to oxidizing organic matter that is present in the liquid in true solution.

At the present time there are in general use two principal methods for purification of organically polluted waters. These are the biological processes so called because the purification is effected through the agency of micro-organisms, either bacteria or protozoa. The activated sludge process is exemplary of this group. In the activated sludge process sewage is first passed through sedimentation basins after which it is retained for from four to six hours in aeration tanks. During this long period of detention the diffused air is constantly passed through the sewage to effect oxidation of the organic matter to a nonputrescible form through the agency of protozoa. This type of aeration is objectionable because of the long detention period necessary and further because it is ineffective when the sewage contains poisons which destroy the life cycle of the protozoa. The present invention is designed and intended to obviate these objections.

In chemical precipitation processes it is the purpose of the present invention to more economically provide for the removal of the true solution fraction of the putrescible organic matter.

The present invention provides a process capable of application to the activated sludge process or to chemical precipitation processes with very little change in the present equipment and cycle of operating conditions.

The application of the invention of the present application to the activated sludge process eliminates the difficulties incident to bacterial poisons generally present in all sewage and cuts down the aeration period of from four to six hours to a period of less than one hour. This results in large saving and greater efficiency of operation. When the present invention is applied to chemical precipitation processes, it eliminates the necessity for using special reagents and equipment for removing the fraction of putrescible organic matter present in the sewage in true solution.

It is especially valuable also in chemical precipitation processes for treating industrial waste such as packing house, creamery, cheese, cannery, strawboard and tannery. The invention in its most specific aspect relates to the employment of special catalysts to induce oxidation of the putrescible organic compounds by atmospheric oxygen.

Ordinarily organic compounds have no affinity for atmospheric oxygen, but it has been ascertained that when a proper catalyst is used oxidation can be rapidly induced. This is particularly true of unsaturated organic compounds. The unsaturated organic compounds present in polluted liquids are responsible, to a very large extent, for the biochemical oxygen demand of the true solution fraction of the organic matter present in the liquid and it is therefore important to oxidize these unsaturated organic compounds.

It has been ascertained that the salts and the hydroxides of the variable valent metals, during oxidation from a low to a higher valence, act as catalysts in inducing the oxidation of organic compounds by atmospheric oxygen.

The metals which can be oxidized at least two units of valence will function satisfactorily in this process. This group comprises chromium, manganese, osmium, tin, vanadium, antimony, bismuth, molybdenum and selenium.

In practicing the process it is desirable to start out with the metal in its low state of valence. For instance, if manganese is used, one should start out with a manganous salt or manganous hydroxide, the manganese in these compounds having a valence of 2. As the metal is oxidized by the oxygen in the diffused air, the organic compounds are likewise oxidized.

Some compounds which do not have a range of valence of over one unit also act as catalysts but these compounds usually become oxidized before the oxidation of the organic matter in the water can be completed and therefore are not generally desirable for use in this process.

The hydroxides constitute the best catalysts and they are consequently to be preferred over the salts. Catalytic reactions are surface reactions and the hydroxides present enormous surfaces for catalytic reactions. The hydroxides may be added as such or may be prepared in the liquid being treated by the addition of lime after the addition of the metal salt. If the metal salt is used, only a wet feed is necessary.

The process may be applied in a conventional fill and draw detention tank operation or a continuous flow treatment may be resorted to. In either event the period of contact required will vary from fifteen minutes to one hour depending upon the particular type of liquid treated and to be oxidized and the quantity of organic compounds present therein. The end products of oxidation are for the most part carbon dioxide and water. The diffused air should of course be supplied somewhat in excess of that necessary for oxidation of the organic compounds present in the liquid.

It will be observed that the process does not depend upon biological agencies and that the oxidation can be effected just as successfully upon any industrial waste as upon domestic sewage and that it can also be effected in the treatment of sewage containing bacterial poisons which would normally destroy the life cycle of the protozoa.

When the process is applied an an activated sludge operation it is substituted for the aeration step now employed in such operations, the only addition necessary being the application of the catalyst. By the introduction of the catalyst, the storage capacity of the aeration tanks in an activated sludge process may be permissibly cut down approximately 80% from the capacity normally employed for carrying out the aeration step in such operations. The process insures a greater reduction of biochemical oxygen demand than now obtained, for example, it has been ascertained that a 15% greater reduction can be obtained by the employment of the usual and conventional aeration step. A very important advantage in the use of the present invention in biological processes resides in the elimination of the harmful effects of bacterial poisons, which at the present time constitute one of the greatest handicaps in the use of bacterial processes.

In the application of the process to chemical precipitation purification operations the oxidation step is employed just prior to coagulation. In such processes the lime employed permits the reaction of the carbon dioxide resulting from the oxidation with the lime to produce calcium carbonate which will be coagulated along with the other matter. The calcium carbonate additionally serves as a sludge conditioner and improves its character. It will be at once apparent that to the extent that organic matter present in the liquid is removed by oxidation, to that extent the amount of sludge is reduced, especially since comparatively large amounts of adsorbents are normally necessarily employed to effect removal of organic matter held in true solution in the liquid.

From the foregoing specification it will be apparent that the present invention comprises a process for rapidly and economically effecting oxidation of putrescible organic matter present in polluted liquids.

What I claim as my invention is:—

1. A process for oxidizing putrescible organic matter in water comprising passing diffused air through the water containing the organic matter to be oxidized and promoting the oxidation by the employment of a catalyzer in the form of a compound belonging to the class including the salts and hydroxides of a metal which can be oxidized at least two units of valence selected from the group including chromium manganese, osmium, tin, vanadium, antimony, bismuth, molybdenum and selenium and continuing the passage of air through the water until at least a substantial portion of the catalyzer compound has been oxidized through two units of valence.

2. An improvement in processes for oxidizing organic matter in water comprising effecting the oxidation in the presence of a compound belonging to the class including the salts and hydroxides of the metals which can be oxidized at least two units of valence by passing an oxidizing gas through the water until at least a substantial portion of the compound has been oxidized through two units of valence.

3. A process for oxidizing organic matter in water comprising adding a catalyst in the form of a compound belonging to the class including the salts and hydroxides of the metals which can be oxidized at least two units of valence to the water and passing air through the water in such manner that it will contact with said catalyst, and continuing the passage of the air through the water for a period of from fifteen minutes to an hour.

4. An improvement in processes for oxidizing organic matter in water comprising effecting the aeration of the water in the presence of an hydroxide of a metal which can be oxidized at least two units of valence selected from the group including chromium, manganese, osmium, tin, vanadium, antimony, bismuth, molybdenum, and selenium and continuing aeration of the water until a substantial portion of said metal hydroxide has been oxidized through two units of valence.

5. An improvement in processes for oxidizing organic matter in water comprising effecting the aeration of the water in the presence of a salt of a metal which can be oxidized at least two units of valence selected from the group including chromium, manganese, osmium, tin, vanadium, antimony, bismuth, molybdenum, and selenium and continuing aeration of the water until a substantial portion of said metal salt has been oxidized through two units of valence.

OLIVER M. URBAIN.